3,733,396
PREPARATION OF ALKALI METAL HEXAFLUOROCHLORATES

John P. Faust, Hamden, Albert W. Jache, North Haven, and Andrew J. Klanica, Cheshire, Conn., assignors to Olin Mathieson Chemical Corporation
No Drawing. Filed Aug. 20, 1965, Ser. No. 482,330
Int. Cl. C01c 7/24; C01d 11/00
U.S. Cl. 423—466     2 Claims This invention relates to a novel method of preparing alkali metal hexafluorochlorates of the formula $MClF_6$ where M is potassium, rubidium or cesium.

According to U.S. Pat. 3,143,391 issued Aug. 4, 1964 to Hurley et al., assignors to Olin Mathieson Chemical Corporation, the alkali metal tetrafluorochlorates of the formula $MClF_4$ are prepared by the direct reaction of an alkali metal fluoride and chlorine trifluoride at temperatures of 50° to 150° C. and at autogenous pressures.

The process of U.S. Pat. 3,143,391 was repeated several times, substituting chlorine pentafluoride for chlorine trifluoride and otherwise observing all the conditions recited in the patent but no product of the formula $MClF_6$ was formed. The alkali metal tetrafluorochlorates were the only M—Cl—F products obtained. The expected reaction did not occur.

The method of the present invention comprises reacting an alkali metal fluoride of the formula MF, where M is potassium, rubidium or cesium with chlorine pentafluoride in a reaction zone limited by, defined by or lined with surfaces of Teflon (polymeric tetrafluoroethylene) at temperatures between about 0° and 150° C. and at autogenous pressure.

The alkali metal fluoride and chlorine pentafluoride are introduced into the reaction zone, suitably a tube of Teflon or a bomb completely lined with Teflon. Suitable proportions of chlorine pentafluoride to alkali metal fluoride range from about 0.1:1 to 5:1 or more. Yields diminish at temperatures much below 0° C. or much above 150° C. Autogenous pressures are suitable. However, the reaction between the solid alkali metal halide and the gaseous or liquid chlorine pentafluoride is slow and a period of hours of contact is advisable. At least eight hours is preferred and several days can be allowed when convenient. The resulting alkali metal hexafluorochlorates are produced in admixture with the alkali metal fluoride and the alkali metal tetrafluorochlorate.

EXAMPLE I

A reactor was formed of a coil of ¼ inch Teflon tubing ten feet in length, closed near each end by pinch clamps. Both ends of the coil were then attached to a metal high vacuum system. The coil was filled with dry nitrogen and 0.82 gram (5.4 millimoles) of cesium fluoride was introduced. The reactor was evacuated and heated to 300° C. for 30 minutes to dry the salt and system completely.

After cooling, 0.4 gram (3 millimoles) of gaseous chlorine pentafluoride was introduced into the reactor which was reclosed by pinch clamps. The reactor and contents were heated in an oil bath for 16 hours at 60° to 75° C. Unreacted chlorine pentafluoride was pumped from the reactor. The increase in weight of the contents of the reactor was 0.25 gram, corresponding to a 40 percent conversion to cesium hexafluorochlorate. The product liberated iodine when added to aqueous potassium iodide. The product, when heated under vacuum at 300–350° C. in the Teflon reactor, decomposed forming chlorine pentafluoride and cesium fluoride.

EXAMPLE II

The reactor of Example I was filled with dry nitrogen and 11.8 millimoles of cesium fluoride was introduced into the reactor. Then 28.4 millimoles of gaseous chlorine pentafluoride were introduced into the reactor which was reclosed. The reactor and contents were heated at 85° C. for 16 hours. Unreacted chlorine pentafluoride was pumped out and the solid product on analysis was found to contain 36.6 percent of $CsClF_4$ and 34.0 percent of $CsClF_6$ and 29.5 percent CsF.

EXAMPLE III

Using the reactor of Example I, 15.9 millimoles of cesium fluoride was reacted with 74.7 millimoles of chlorine pentafluoride at 140° C. for 48 hours. The product contained 41.0 percent of $CsClF_4$ and 34.5 percent of $CsClF_6$, 24.5 percent of CsF.

EXAMPLE IV

To compare the procedure and results of Examples I, II and III with the same procedure carried out in nickel, the following experiments were carried out in a 150 ml. nickel reactor fitted with a Monel valve. The reactor was filled with dry nitrogen and 32.3 millimoles of CsF were introduced. The reactor was evacuated and cooled with liquid nitrogen and 50 millimoles of chlorine pentafluoride was introduced.

The reactor was re-closed and heated at 75° C. for 64 hours. Unreacted chlorine pentafluoride was pumped from the reactor. The increase in weight of the solid and its elemental analysis showed a yield of 49.3 percent of $CsClF_4$ but no $CsClF_6$ was formed.

The procedure described above in this example was repeated using 32.9 millimoles of CsF and 54.4 millimoles of chlorine pentafluoride heated at 150° C. for 16 hours. The yield of $CsClF_4$ was 92.1 percent but the yield of $CsClF_6$ was zero.

EXAMPLE V

A 650 ml. Teflon-lined reactor fitted with a Teflon-covered magnetic stirrer was charged with 1.98 g. (18.2 millimoles) of RbF. The reactor was evacuated and then pressured to approximately 1.1 atmospheres (3.19 millimoles) with chlorine pentafluoride. The reactor and contents were heated to 70° C. and maintained at that temperature for 13 days. From time to time additional chlorine pentafluoride was pressured into the reactor to maintain a pressure of 1.1 atmospheres. At the end of this time unreacted chlorine pentafluoride was pumped from the reactor and the white solid product was removed. Elemental analysis showed the following product composition:

|  | Percent |
|---|---|
| RbF | 37.6 |
| $RbClF_6$ | 28.5 |
| $RbClF_4$ | 34.6 |

The product when tested with aqueous potassium iodide gave a vigorous reaction indicating strong oxidizing power.

EXAMPLE VI

Into a 650 ml. Teflon-lined reactor was charged 0.95 g. (16 millimoles) of potassium fluoride. The reactor was evacuated and then pressured with chlorine pentafluoride to approximately 1.1 atmospheres (3.19 millimoles). The reactor and contents was heated to 70° C. and maintained at that temperature for 4 days. At the end of this time, unreacted chlorine pentafluoride was pumped from the reactor and the white solid product was removed. Elemental analysis showed the following composition:

|  | Percent |
|---|---|
| KF | 68.54 |
| $KClF_6$ | 6.50 |
| $KClF_4$ | 24.97 |

This product showed good oxidizing power upon reaction with potassium iodide.

EXAMPLE VII

A 25 ml. Teflon reactor was charged with 2.3 g. (15.1 millimoles) of cesium fluoride and 8.3 g. (65.5 millimoles) of liquid chlorine pentafluoride. The reactor was closed and stood for 24 hours at room temperature. The unreacted chlorine pentafluoride was pumped off and the white solid product was removed. Elemental analysis showed the following composition:

| | Percent |
|---|---|
| CsF | 24.32 |
| $CsClF_6$ | 40.49 |
| $CsClF_4$ | 35.60 |

This product showed vigorous oxidizing power with aqueous potassium iodide.

What is claimed is:

1. Process for preparing alkali metal hexafluorochlorates having the formula $MClF_6$ where M is potassium, rubidium or cesium which comprises reacting MF with chlorine pentafluoride in a reaction zone defined by surfaces of polymeric tetrafluoroethylene at about 0° to 150° C. and at autogenous pressure.

2. Process of claim 1 in which the molar ratio of chlorine pentafluoride to MF is at least 0.1:1.

References Cited

UNITED STATES PATENTS 3,620,689  11/1971  Faust et al. _____ 423—466

OTHER REFERENCES

Stacey et al., Advances in Fluorine Chemistry, vol. 4, 1965, Butterworth Inc., Washington, D.C., p. 240 QD18/FIA3.

LELAND A. SEBASTIAN, Primary Examiner

U.S. Cl. X.R.

423—490